May 13, 1930.  H. E. BREY  1,758,216
TRACTION DRIVING MECHANISM
Filed May 21, 1925   6 Sheets-Sheet 1

Inventor
H. E. Brey
By Robb, Robb & Hill
Attorneys

May 13, 1930. H. E. BREY 1,758,216

TRACTION DRIVING MECHANISM

Filed May 21, 1925 6 Sheets-Sheet 6

Fig. 9

Inventor
H. E. Brey
By Robb & Robb
Attorneys

Patented May 13, 1930

1,758,216

UNITED STATES PATENT OFFICE

HAROLD E. BREY, OF MILWAUKEE, WISCONSIN, ASSIGNOR TO KOEHRING COMPANY, OF MILWAUKEE, WISCONSIN

TRACTION DRIVING MECHANISM

Application filed May 21, 1925. Serial No. 31,849.

This invention has to do with the improvement of traction driving mechanism designed especially for heavy portable machines such as concrete pavers and mixers, cranes or the like, which machines are at the present time to a large extent being mounted upon endless traction devices.

Among the objects of the invention are the provision of traction driving means affording a very flexible control for the movement of the machine equipped therewith, the provision of a driving mechanism including brake and clutch instrumentalities, with the brake means so designed that the driving power for the traction devices is actually used for the disengagement of the clutch instrumentalities.

Another novel provision of the invention is the special design of brake and clutch mechanism employed whereby positive driving forces are readily transmitted to the driven traction means, and the brake mechanism is not only utilized to cause the disengagement of the clutch means by power, but may be readily applied so as to regulate the braking forces in such a way as to positively stop and practically lock one traction device against movement whilst the other continues in action, whereby the machine equipped with the traction means may turn about in either direction on either one of its traction devices as a sort of pivot.

In the carrying out of the invention moreover the clutch and brake units have been so designed as to afford especial rapidity of action, a ndpositivity of locking, whereby to minimize the forward or rearward creep of the multiplanes or traction devices which support the machine.

The invention additionally involves the provision of brake and clutch units of a novel type wherein I employ a driving element upon the driving shaft for the endless traction devices, which driving element is adapted to be clutched with a floating driven element or spider and unclutched therefrom, under control of a brake or locking drum, the relations of these parts being established by the peculiar cooperation of clutch roll sets interposed therebetween.

The invention includes other details of construction and arrangements of mechanisms and parts thereof, the advantage of which will appear on reference to the accompanying drawings in the latter of which.

Reverting to the suggestions herein regarding the flexibility of the control of the clutch and brake units forming essential features of the invention, it is notable that these units are adapted for effective operation whether the machine is being moved forwardly or rearwardly, whereby to control the driving speed of the machine by the propulsion of its multiplanes or endless traction devices, in either direction, and to additionally control the turning of the machine to the right or left when it is moving forwardly or rearwardly. This is an essential phase of desirable control in machines for which the traction driving means hereof is especially useful.

Figures 1, 5, 6:
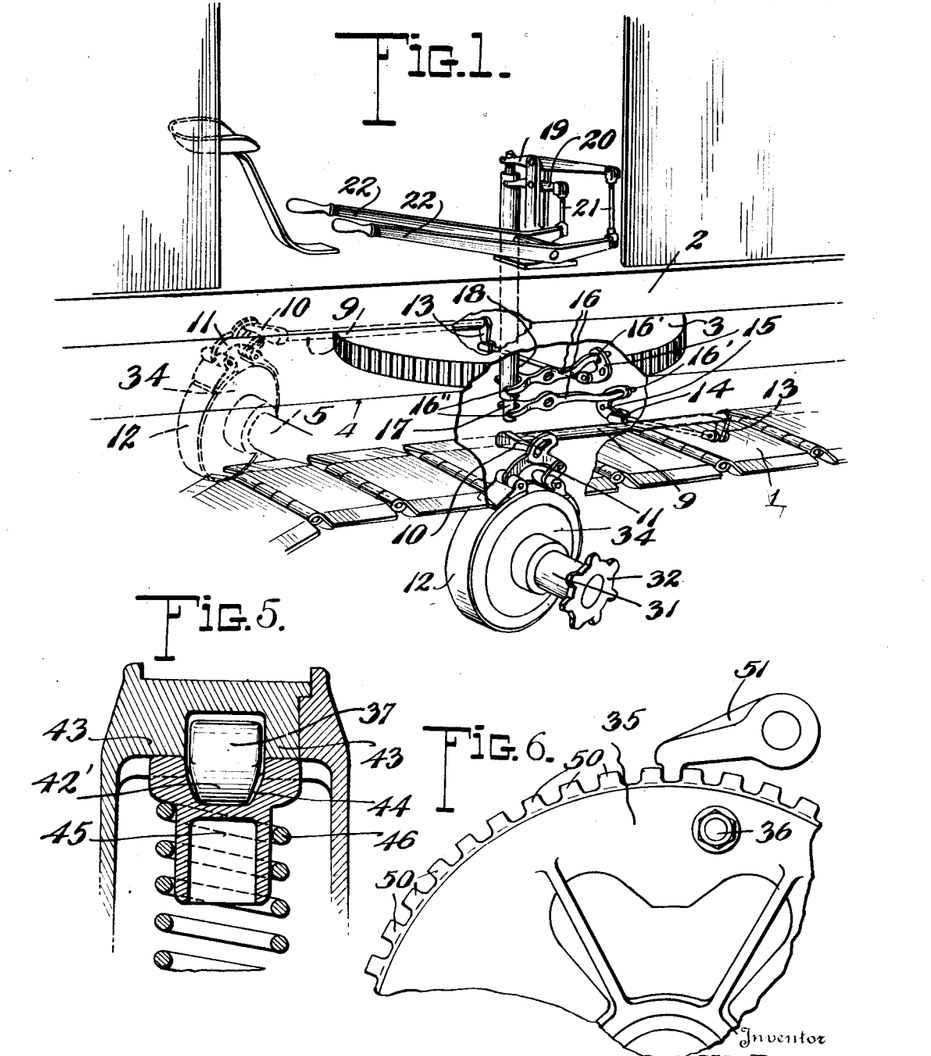
Figure 1 is a diagrammatic perspective view of certain main parts of a rotary crane illustrating in a general way the control of the brake and clutch units, by which the action of the traction devices is governed and the speed and turning movements of the machine correspondingly controlled.
Figure 5 is a fragmentary sectional view taken about on the line 5—5 of Figure 2.
Figure 6 is a fragmentary side view showing a modified formation of the clutch and locking unit utilizing certain of the principles of the invention.

Referring in a general way to Figure 1, I have illustrated my invention as adapted to a portable rotary crane of the type having its own travel base comprising the multiplanes 1. Such a crane ordinarily includes the car or body 2 carried by the turntable 3, so as to be swung in the customary way with the hoisting and excavating means that may be carried by the said body. The excavating means usually includes an excavating bucket or dipper, the buckets being employed in clam shell and drag line work, and the dippers utilized when the crane is designed as a shovel excavator. The body is supported upon a traction base 4, which includes suitable multiplane or tractor frames by which the endless traction devices are carried.

Figure 2:
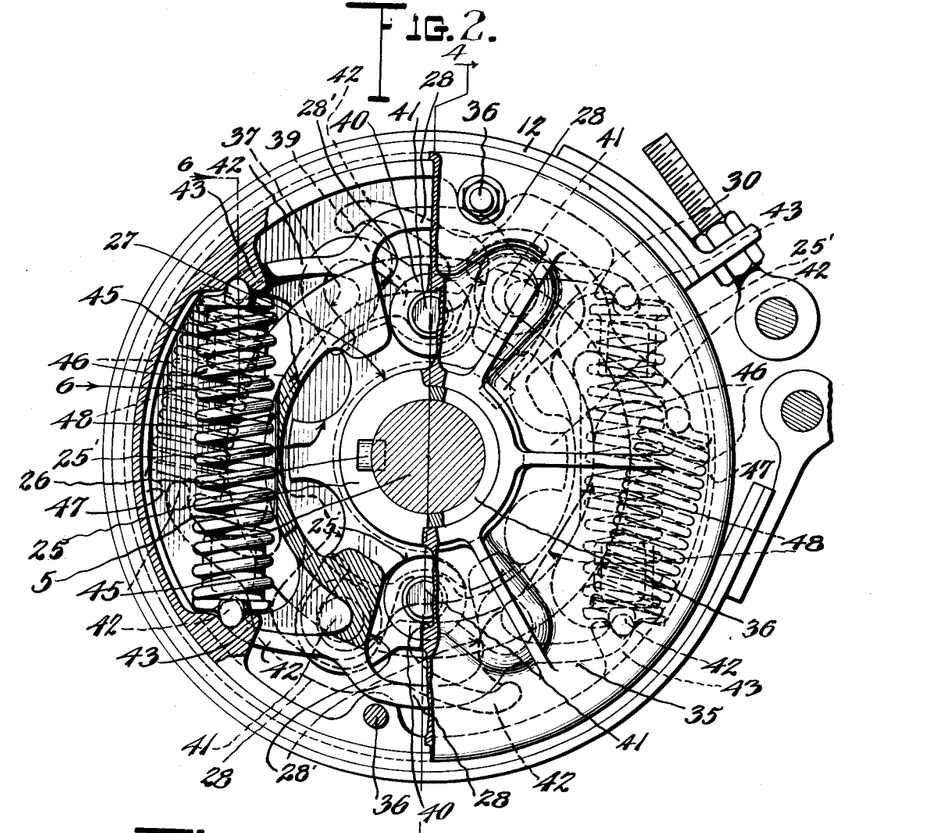
Figure 2 is a side view of one of the clutch and brake units showing the side cover plate broken away and illustrated in sections so as to expose certain of the interior working parts of the unit.
Figure 3:
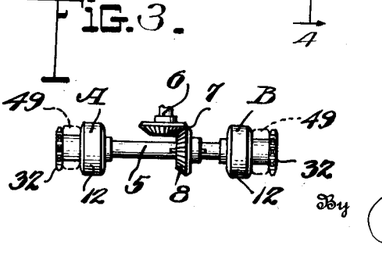
Figure 3 is a simplified assembly view showing the driving means for the drive shaft and the disposition of the clutch and brake units on the latter, including the driving sprockets for the multiplanes.

Figure 3 shows how a center pin driving shaft 6, which is disposed at the center pin axis of the machine equipped with a gear 7 meshing with a similar gear 8, by which motion is transmitted from the power plant, not illustrated, is carried by the body 2 of the machine, downward to the drive shaft 5. For the forward driving of the machine we will say that the shaft 5 is driven in clockwise direction, looking from the right, and any suitable mechanism included in the drive gearing on the body 2, not illustrated, may be utilized to reverse the drive of the shaft 6 and correspondingly reverse the turning of the shaft 5, to thereby cause movement of the machine rearward at will. Such operation of a drive shaft for endless traction devices of a machine of this class is well known. On the shaft 5 are supported the clutch and brake units which form essential features of the invention and which are best illustrated in Figures 2 and 4 of the drawings.

For the moment, we shall assume that the clutch and brake units, which are designated as a whole as "A" and "B", include brake and clutch instrumentalities, the two for each unit being governed by a rock shaft 9 at a side of the machine, which rock shaft has a rocker arm 10 engaged with a brake band actuating member 11 connected with a brake band 12, forming a part of each unit "A" and "B." The rocker shaft 9 has another rocker arm 13 connected by a link 14 with a bell crank lever 15 engaged by an operating lever 16 at the end 16' of the latter. The operating lever at its opposite end 16'' is forked and thus engaged with an actuating rod 17 which passes downwardly through the center pin axis of the machine. One of the levers 16 cooperates with the rod 17 and the other lever 16, there being two, one for each of the units "A" and "B," is engaged with an actuating sleeve or tube 18 that surrounds the rod 17 in a sort of telescopic cooperation therewith. At their upper ends the actuating rod 17 and the sleeve 18 are attached to other actuating levers 19 and 20, respectively, connected by the links 21 with the main hand levers 22, one of which is utilized for each of the units "A" and "B."

The operating connections with the clutch and brake units "A" and "B" having been set forth, the detail construction of each unit itself will be presented. It is to be understood, however, that the present invention involves not only the control features for the units, and said units, in combination, but the units themselves are susceptible of useful employment with other control means than those which have been above generally presented. Considerable modification, therefore, of the operating mechanism of the invention as herein set forth may be made within the purview of the said invention as governed by the spirit and scope of the claims finally appended hereto. As the connecting means between each of the multiplanes or endless traction members 1 and its associated brake and clutch unit, and the unit structures themselves are identical, a single one of these connecting means and unit structures will be described.

Figure 4:
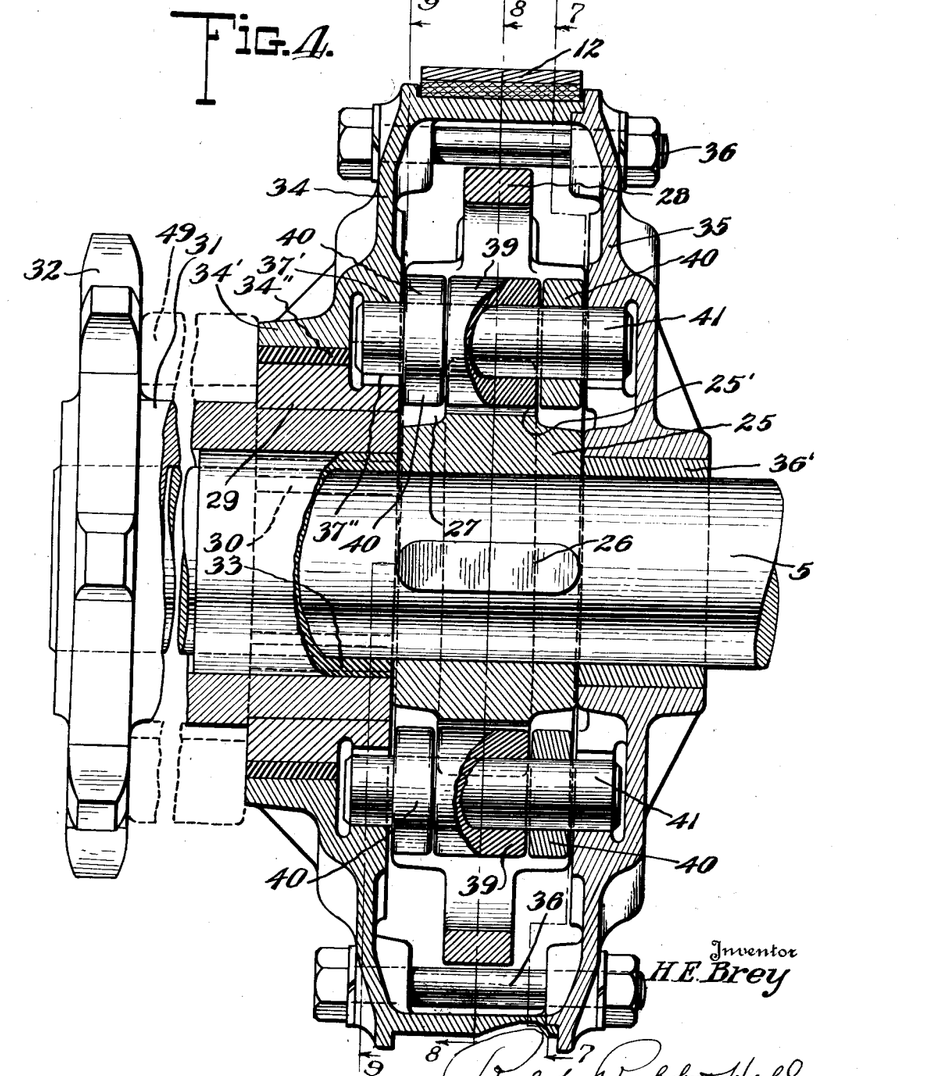
Figure 4 is a sectional view taken about on the line 4—4 of Figure 2.
Figure 8:
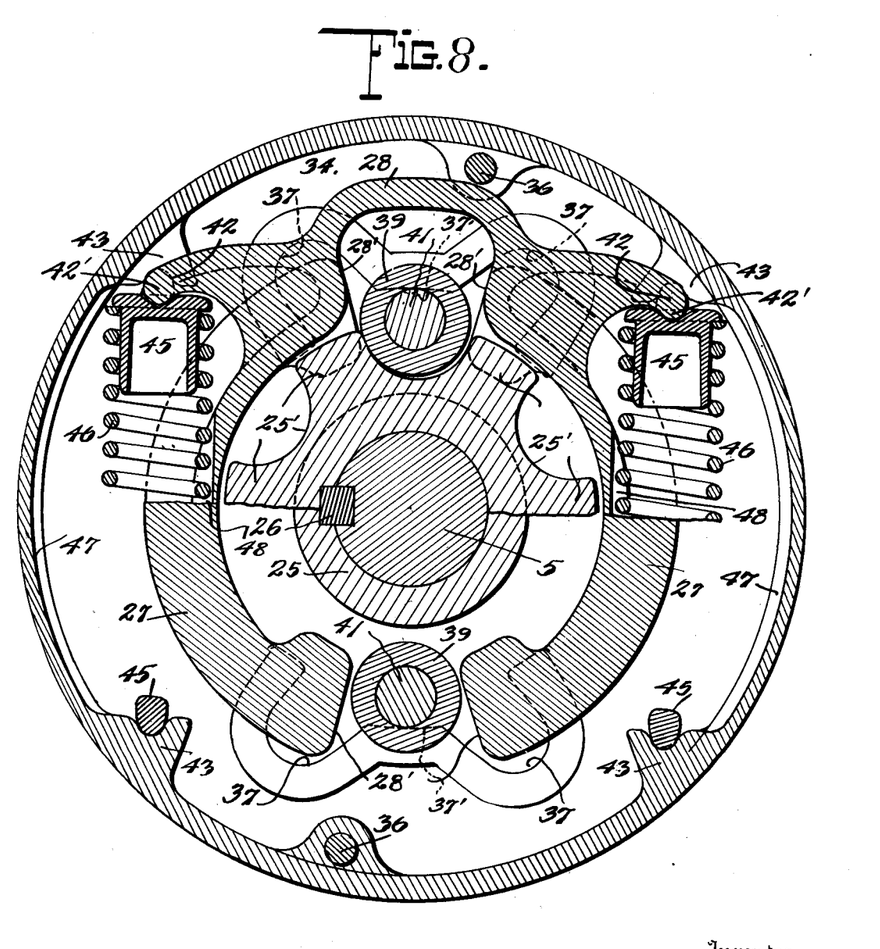

On an end of the drive shaft 5 is secured the driving clutch member 25 by means such as the key 26 as best seen in Figures 4 and 8. The member 25 is of somewhat spider like form, being provided with a series of teeth or suitably rounded radially-extending, uniformly-spaced lugs 25'. Surrounding the driving clutch member 25 is a driven clutch member 27 somewhat in the form of a spider being formed to provide two symmetrical half structures connected together at diametrically opposite points by arches 28, whereby gaps or spaces are provided, forming opposed radial walls 28'. A pair of these walls is thus to be found at diametrically opposite portions of the driven clutch member. The said driven clutch member 27 has an offstanding hub 29, which is keyed as shown at 30 in Figure 4 to the hub extension 31 of a driving sprocket tumbler or the like designated 32, which is connected by a sprocket chain with the multiplane or endless traction device adjacent to the unit now being described or the sprocket 32 may be a driving tumbler or a gear adapted to actuate the multiplane in any well known manner. The sprocket 32 with its hub extension 31 is suitably bushed upon the shaft 5, as by the bushing 33 to freely revolve relatively to the said shaft. In other words, the clutch mechanism to be shortly described is employed for connecting the drive clutch member 25 with the driven clutch member 27, in order to transmit motion from the shaft 5 to the drive sprocket 32, or permit the latter to operate under independent control when the drive from the shaft 5 is discontinued Figures 2 and 4 clearly show that the driven clutch member 27 is enclosed by a shell preferably made in two parts, namely a clutch housing 34, which takes somewhat the form of a drum, and a cover plate 35 which closes the said housing at one side of the same. The housing 34 has an extended hub structure 34' suitably bushed as 34'' for permitting it to revolve freely on the hub extension 29 of the driven clutch member. The clutch housing 34 is formed peripherally into a brake drum which is surrounded by the brake band 12, previously referred to. The parts 34 and 35 of the shell, of which the housing forms a member, are connected together solidly by suitable bolts 36 and the cover plate 35 is bushed at 36', and adapted to freely rotate relatively to the drive shaft 5.

Provided in the opposing inside walls of the parts 34 and 35 are V-shaped pockets or recesses 37, that comprise the radial side portions or extensions forming the sides of the V, so to speak, and the center connecting portions 37' establishing communication or forming a continuation from one of the pockets 37 to the other pocket 37. An opposing pair of these pockets 37 are provided at diametrically opposite portions of the shell in the members 34 and 35, and adjacent to each of the gaps or spaces beneath the arches 28.

Clutch means between the driving clutch member and the driven clutch member 27 are provided in the form of roller sets, one set for each pair of the pockets 37. Each roller set comprises a central roller 39, laterally disposed narrower rollers 40, and a pintle 41 on which rollers 39 and 40 are rotatably mounted. The ends of pintle 41 extend beyond rollers 40 and are adapted to operate in the pockets 37, at the sides of the pockets and at the central portions, where are provided the wearing faces or walls 37', previously mentioned. The driven clutch member 27 is so arranged that the opposed wall 28' of the spaces beneath the arches 28 are adapted to cooperate with the spaced narrow rollers 40 of each roller set, the drive clutch member 25 being centralized in relation to the driven clutch member 27, as seen best in Figure 4, so that the broad central roller 39 on the pintle 41 of the roller set is engageable with and between the teeth or lugs 25' of the drive clutch member 25.

Obviously, when the parts are in the positions of the full line showing in Figures 2, 7, 8, and 9, where the pintles 41 of the two roller sets operate in the central portions of the pockets 37 between the wearing walls or surfaces 37', the rollers of the roller sets establish an interlocking between the drive clutch member 25 and the driven clutch member 27. It is, furthermore, clear that under the above conditions movement may be transmitted from the shaft 5 to the driving sprocket 32 in either direction, owing to the clutch relation between the parts 25 and 27. At such time, by reason of the construction to be shortly set forth, the drum like clutch housing 34 turns with the member 27.

The unclutching of the parts 25 and 27 is accomplished by arresting the movement of the clutch housing 34 by tightening its brake band 12. This action is effective because the continued rotation of the drive clutch member 25 with the shaft 5, under the new conditions stated, compels the pintles 41 to be moved from the central portions of the pockets 37 up corresponding opposite sides of the said pockets, in effect, thus camming the pintles into a position in which the rollers 39 are moved a sufficient distance outwardly in the spaces within the arches 28 to cause them to clear the teeth or lugs 25' of the drive clutch member 25. Thereupon the drive clutch member 25 continuing its rotation with the drive shaft 5 is no longer interlocked with the driven clutch member 27 and the drive from the shaft 5 to the driving sprocket 32 of the multiplane or endless traction device is thus discontinued.

The arrangement of the driven clutch member 27 and the shell comprising the parts 34 and 35 is such that there is a floating movement of the driven clutch member 27 allowable within the shell relatively to the latter. The connections between the shell and the driven clutch member 27 include four outwardly extending arms 42 carried by clutch member 27 and four pairs of lugs 43, carried by the clutch housing 34. The lugs 43 of each pair are spaced so that the arms 42 may work in the spaces therebetween, said arms having cylindrical terminations 42' adapted to seat in the recesses 44 in the outer ends or tops of the spring retaining cups 45. The cups 45 hold in proper positions the coiled springs 46, two of which springs are used one at each side of the clutch housing 34. These springs 46 tend to normally hold the driven clutch member 27 in what may be called a centered normal position within the clutch housing 34, at which position the pintles 41 are disposed in the center connecting portions 37' of the V-shaped recesses or pockets 37. At such time, of course, the pintles 41 maintain the rollers 39 and 40 in their clutching position interlocking the parts 25 and 27.

The inner periphery of the clutch housing 34 is cored out as at 47, at two places adjacent to the springs 46 to permit of shifting movement of the cups 45 within the housing 34, when the driven clutch member 27 shifts relatively to the said housing. Furthermore, the driven clutch member 27 is slightly grooved, as shown at 48, to afford the freedom of shifting movement of the springs.

In Figure 2 the dotted line position of the parts illustrates how the relation of the driven clutch member 27 changes in respect to the clutch housing 34 when the brake band 12 is tightened to hold the clutch housing stationary for effecting the unclutching movement of the parts.

The roller sets, each comprising the rollers 39 and 40, are made up of three parts primarily for the purpose of overcoming the friction incident to the clutching and unclutching action of the sets in cooperation with the drive clutch member 25 and the driven clutch member 27. When releasing the clutch and applying the brake, as exemplified in Figure 2, by the movement of the parts from the full line positions to the clutch release positions of the dotted lines, the pintle 41 of each roller set revolves contra-clockwise with the roller 39. On the return movement of the parts to normal clutching position the rollers 40 rotate in a contra-clockwise direction in contact with the right hand wall 28' of the gap or space surmounted by the upper arch 28, and the corresponding wall in respect to the lower gap or space. At the same time the roller 39 revolves in a clockwise direction while in engagement with the adjacent tooth or lug of the drive clutch member 25. It is under these conditions that the desirability of oppositely rotative anti-friction rollers 39 and 40 arises, for which reason the separate rollers for engagement, certain of them with the driven clutch member 27 and others with the drive clutch member 25, are employed.

The clutch housing 34 and the driving sprocket 32 are separated by means of the frame bearing 49.

Under practical conditions of use of the invention the shifting of the driven clutch member from the full to the dotted line position of Figure 2 is occasioned by the continued straight line of travel of a released multiplane of the machine on which the invention is used. This force easily overcomes the compression spring action of the springs 46 to thereby cause the right hand wall of the upper space or gap beneath the arch 28, and the corresponding wall of the lower gap or space to move from their contacts with the roller 39 which transmit the pressure that oscillates the driven clutch member 27. Of course, this separation of contact action is halted because of the roller set being ultimately gripped within the gaps or spaces under the arches 28, as shown by the dotted lines in Figure 2. In the shifting operation the compression springs 46 do not become distorted from their cylindrical coiled alignment as indicated by the dotted line compressed illustration of the spring at the right in Figure 2.

In the use of the machine it is obvious that by properly controlling the levers 22, if the clutch and brake drive units are causing forward movement of the machine the clutch housing 34 of the particular unit controlling either traction device or multiplane of the machine, may be checked or stopped to effect the clutch release action and then a braking effect on such unit caused to a greater or less extent to determine the turning or steering radius of the machine. Of course, if the braking effect is such as to lock the shell comprising the parts 34 and 35 against movement the clutch will not only be fully released but the driving sprocket 32, connected with the now locked shell 34—35, will correspondingly be locked against rotation maintaining the particular multiplane or traction device stationary. The other multiplane or traction device by continuing to operate will cause the turning of the machine in the direction of the stopped multiplane, the latter acting as a sort of pivot in the turning movement. There is, therefore, obtained a very considerable nicety of operating adjustment and action of the multiplanes for steering purposes, enabling the clutch drive to either multiplane to be released permitting such multiplane to idle; enabling also a release of the said clutch and the partial application of the brake on said multiplane, so that a controlled amount of movement of the released multiplane may take place; and enabling a full release of the clutch drive from said multiplane and a locking action of the brake means to wholly discontinue the movement of the multiplane for steering on a sharp radius, permitting an almost right angled turn of the machine.

Owing to the peculiar formation of the gaps or spaces beneath the arches 28, and the use of the radial portions at the ends of the recesses or pockets 37, it becomes evident that the controlling actions of the control levers 22 may take place whether the machine is being propelled forwardly or rearwardly. Likewise, it must be evident that by the simultaneous operation of the two levers the clutch means of the units "A" and "B" may both be released, and the locking of the brake means applied so that both multiplanes will not only not be driven but they will be locked stationary so as to maintain the whole machine solidly stationary. This is especially advantageous in operating the machine as a shovel when the dipper is being crowded out against the work in filling the same with a load to be dumped thereby.

Figure 6 illustrates a modified adaptation of the invention wherein the brake means is dispensed with, the clutch housing 34 being equipped with peripheral teeth 50 engageable by a lock dog 51. The dog 51 of each clutch and locking unit, according to this construction, may be operated by a lever equivalent to one of the levers 22 and the clutch housing thus locked against movement whereupon the operation of the associated multiplane or traction device is discontinued and the said device is locked for the purpose of the steering action of the machine.

It will be evident from the foregoing that from a mechanical viewpoint the walls 28' of the gaps or spaces beneath the arches 28 constitute abutment means cooperative with the roller sets. Furthermore, the clutch housing 34 and its cover plate 35, in effect, constitute a carrier for the roller sets housing the drive and driven members and supporting the said roller sets normally in clutching positions. The recesses or pockets 37 virtually form guiding means for the pintles 41 to direct them in a path of movement enabling them to shift the roller sets in such a manner that the clutch relation of the same to the drive member is disestablished.

Figure 7:
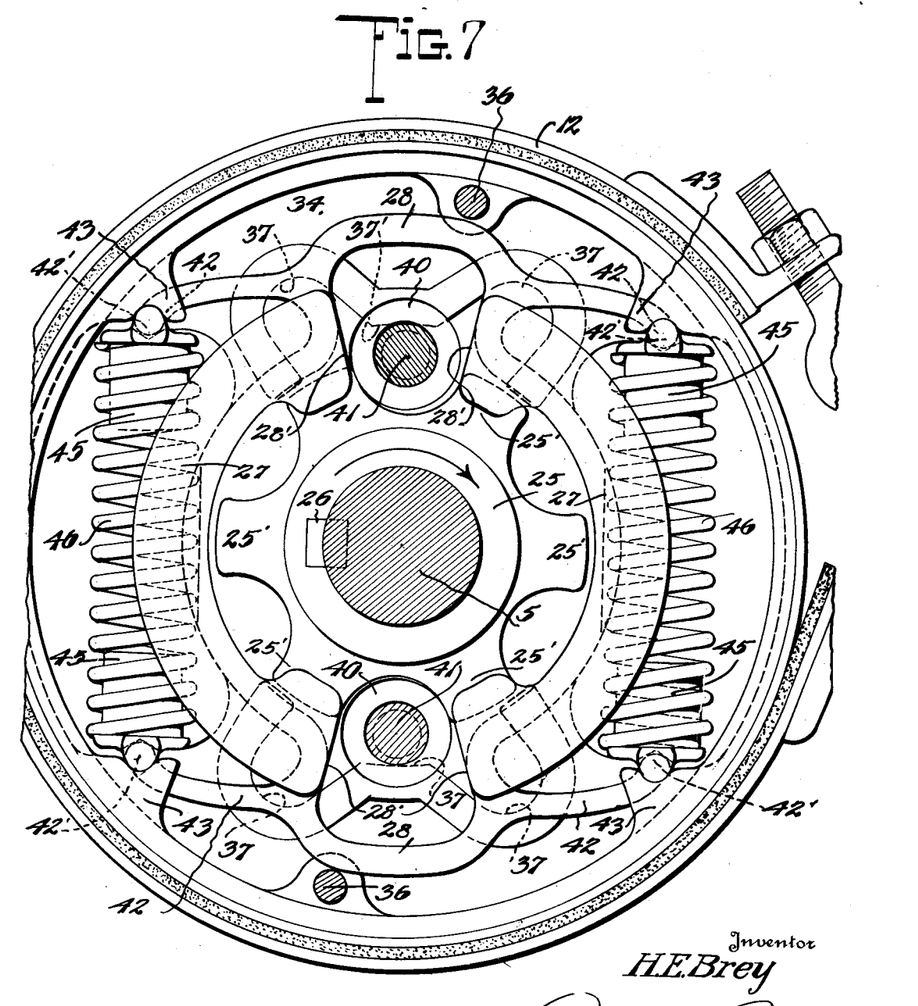
Figures 7, 8 and 9 are respectively transverse axial sections taken on the planes indicated by lines 7—7, 8—8, and 9—9, respectively of Figure 4, and illustrating in clarified detail, the structures shown in Figure 2.
Figure 9:
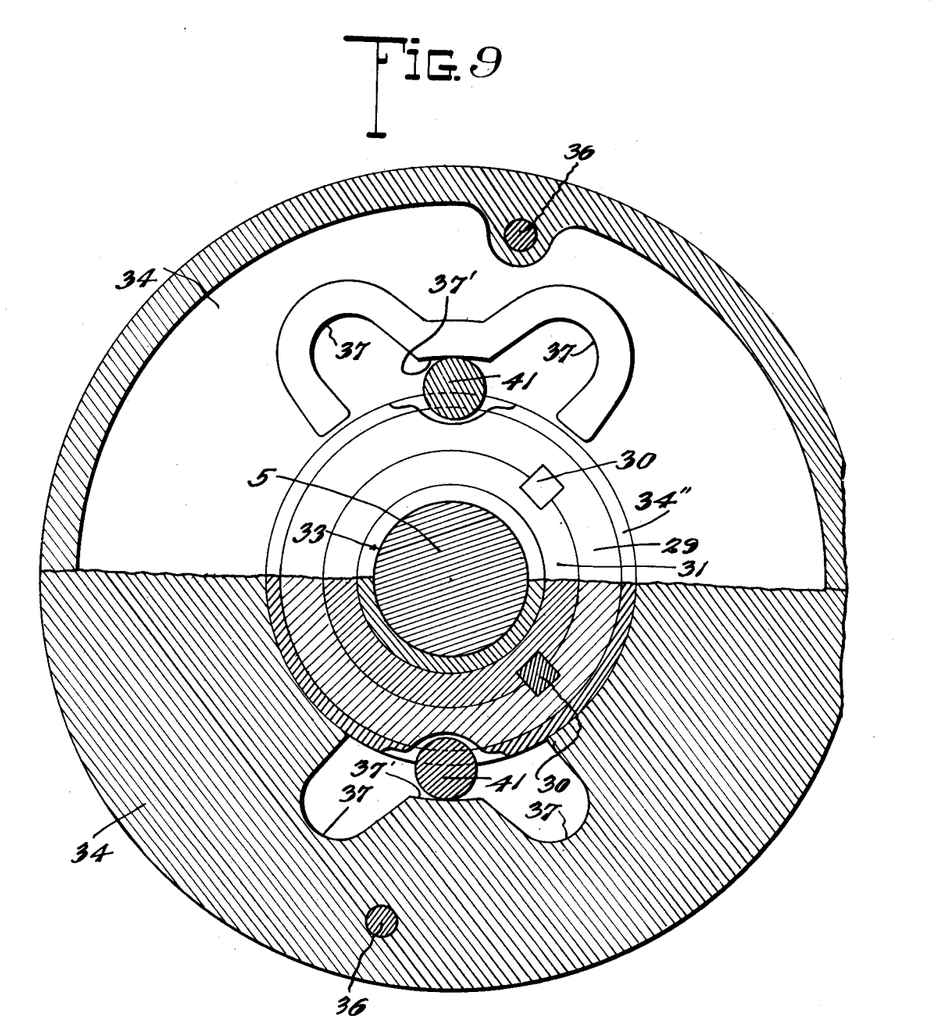

As will be best seen in Figure 8 and also observable in Figures 2, 7 and 9, each of the clutching sets made up of the pintle 41 and its rollers 39 and 40, is held against radial dislocation by the abutments 37' of the clutch housing 34 and its cover plate 35 so long as said clutch housing is free to revolve with the clutch elements 25 and 27. Thus, the lugs or radial projections of clutch member 25 impart their thrust to the rollers 39, delivering it through pintle 41 and rollers 40 against the abutments 28' of clutch member or spider 27. However, as soon as clutch housing 34 begins to be retarded by frictional resistance from brake band 12, so that relative movement occurs between said housing and the clutch members, each of the roller sets 39, 40 and 41 moves bodily relative to abutments 37' angularly of the structure to an alignment with respect to one or the other of the recesses 37 at one or the other sides of the abutments 37', and the said roller sets are forced out into the respective recesses by the particular driving lugs 25' of clutch member 25. In assuming this position, the clutch members 25 and 27 will have moved angularly with respect to the clutch housing sufficiently for causing the springs 46 to become compressed and to exert spring tension tending to restore the clutch housing and clutch member 27 to the normal operative position. The spring tension, thus exerted, expresses itself through the abutting walls 28' against the rollers 40 and causes the end portions of pintle 41 to be thereby stressed against the base or end of the respective recess 37, and to be retained in said recess until such tension is relaxed, and the clutch member 27 and housing 34 are relatively moved back toward and to the original normal operative position. This return movement occurs only upon release or relative release of the clutch band 12, and thereupon, occurs automatically, whereby the tension of springs 46 not only returns the housing 34 and clutch member 27 to normal, but also causes the abutments 28 to move the roller sets back to the starting position, whereat the pintle 41 is again held against radial dislocation, and therefore, in position for transmitting motion between the clutch members. Thus, it will be seen that the bodily movement of the roller sets out into the recesses 37, leaves the clutch member 25 free to revolve, so long as the clutch housing 34 is held against rotation, and at the same time, since the clutch member 27 is keyed at 30 to the driving sleeve of sprocket 32, the braking force of brake band 12, will be exerted against the sprocket 32 and parts geared thereto, as soon as the clutch member 27 reaches the limit of its relative movement represented by the compression of the springs 46 and the setting of the roller sets in the respective recesses 37.

Having thus described my invention, what I claim as new and desire to secure by Letters Patent is:

1. A clutch unit of the class described, comprising a drive clutch member operable by a shaft, a driven clutch member, clutch instrumentalities to interlock the two and means to guide the said interlocking clutch instrumentalities to positions disengaging them from the drive clutch member under the influence of positive driving action of the drive clutch member, comprising a shell enclosing the drive and driven clutch members and having pockets for performing the guiding function aforesaid, and retaining means for holding the clutch instrumentalities in interlocked position on the shell.

2. A clutch unit of the class described, comprising a drive clutch member operable by a shaft, a driven clutch member, clutch instrumentalities to interlock the two and means to guide the said interlocking clutch instrumentalities to positions disengaging them from the drive clutch member under the influence of positive driving action of the drive clutch member, comprising a shell enclosing the drive and driven clutch members and having pockets for performing the guiding function aforesaid, the clutch instrumentalities consisting of roller devices engageable between the drive clutch member and the driven clutch member to interlock them together and pintle means for said roller means for guiding the roller means into positions released from the drive clutch member to establish an unclutched relation between it and the driven clutch member.

3. A clutch and brake unit of the class described, comprising a drive clutch member of toothed formation adapted to be driven by a shaft, a driven clutch member surrounding the drive clutch member and having abutments opposed to the teeth of the drive clutch member, roller means intermediate the said teeth of the drive clutch member and abutments of the driven clutch member, a carrier for the roller means having means to guide said roller means out of engagement with the drive clutch member, roller restoring means and a brake element cooperative with said carrier to render same effective to perform said guiding function and to render effective said means to restore the roller means to clutch the drive and driven clutch members together.

4. A clutch and brake unit of the class described, comprising a drive clutch member of toothed formation adapted to be driven by a shaft, a driven clutch member surrounding the drive clutch member and having abutments opposed to the teeth of the drive clutch member, roller means intermediate to the said teeth of the drive clutch member and abutments of the driven clutch member, a carrier for the roller means having means to guide said roller means out of engagement with the drive clutch member, roller restoring means, and a brake element cooperative with said carrier to render same effective to perform said guiding function and to render effective said means to restore the roller means to clutch the drive and driven clutch members together, the roller means comprising roller sets including a roller to engage the teeth of the drive clutch member, and a second roller to engage the abutments of the driven clutch member.

5. A clutch and brake unit of the class described, comprising a drive clutch member of toothed formation adapted to be driven by a shaft, a driven clutch member surrounding the drive clutch member and having abutments opposed to the teeth of the drive clutch member, roller means intermediate the said teeth of the drive clutch member and abutments of the driven clutch member, a carrier for the roller means having means to guide said roller means out of engagement with the drive clutch member, roller restoring means and a brake element cooperative with said carrier to render same effective to perform said guiding function and to render effective said means to restore the roller means to clutch the drive and driven clutch members together, the roller means comprising roller sets including a roller to engage the teeth of the drive clutch member, a second roller to engage the abutments of the driven clutch member, and pintle means supporting said rollers for cooperation with the carrier to enable the latter to perform its guiding function.

6. In a clutch and brake unit of the class described, a drive clutch member having radial teeth, a driven clutch member having radial abutments and surrounding said drive clutch member, clutch means between the said members including roller sets comprising a roller for cooperation with the teeth of the drive member and a roller for cooperation with the abutments of the driven clutch member, pintle means supporting said rollers of the roller sets, and a carrier for the pintle means cooperative therewith to control the disengagement of the roller coacting with the drive clutch member to unclutch the said drive and driven clutch members.

7. In a clutch and brake unit of the class described, a drive clutch member having radial teeth, a driven clutch member having radial abutments and surrounding said drive clutch member, clutch means between the said members including roller sets comprising a roller for cooperation with the teeth of the drive member and a roller for cooperation with the abutments of the driven clutch member, pintle means supporting said rollers of the roller sets, and a carrier for the pintle means cooperative therewith to control the disengagement of the roller coacting with the drive clutch member to unclutch the said drive and driven clutch members, said carrier having a guiding means acting on the pintle means to cause the roller engaging the drive clutch member to clear the same in effecting the unclutching operation, and manual means to control the carrier whereby to effect unclutching and clutching action of the said roller sets.

8. In a clutch and brake unit of the class described, a drive clutch member having radial teeth, a driven clutch member having radial abutments and surrounding said drive clutch member, clutch means between the said members including roller sets comprising a roller for cooperation with the teeth of the drive member and a roller for cooperation with the abutments of the driven clutch member, pintle means supporting said rollers of the roller sets, and a carrier for the pintle means cooperative therewith to control the disengagement of the rollers coacting with the drive clutch member to unclutch the said drive and driven clutch members, and means intermediate the carrier and the driven clutch member for normally maintaining the roller sets in active clutch relation respecting the drive and driven clutch members, but yieldable to permit the unclutching action under the control of the carrier.

9. In combination, a drive clutch member, a driven clutch member, the drive clutch member having radial teeth, the driven clutch member surrounding the said drive clutch member and having radial opposed abutments, clutch means intermediate the said two members including a roller set comprising a roller to engage the drive clutch member and a roller to engage the driven clutch member, a common axis for said rollers including a pintle, means controlling the position of the pintle including a carrier therefor adapted to guide the movement of the pintle to cause same to assume a position where its drive member clutch roller is unclutched from the drive member, spring means normally maintaining the driven clutch member and said carrier in positions wherein the roller set clutches the drive and driven members together, and means controlling the carrier to cause its guiding means to effect the unclutching action aforesaid.

10. In combination, a drive clutch member, a driven clutch member, the drive clutch member having radial teeth, the driven clutch member surrounding the said drive clutch member and having radial opposed abutments, clutch means intermediate the said two members including a roller set comprising a roller to engage the drive clutch member and a roller to engage the driven clutch member, a common axis for said rollers including a pintle, means controlling the position of the pintle including a carrier therefor adapted to guide the movement of the pintle to cause same to assume a position where its drive member clutch roller is unclutched from the drive member when moving in either direction, spring means normally maintaining the driven clutch member and said carrier in positions wherein the roller set clutches the drive and driven members together, and means controlling the carrier to cause its guiding means to effect the unclutching action aforesaid.

11. The combination, with driving means and means driven thereby, of clutch and brake means interposed between the driving and driven means for transmitting and controlling the power delivered from the driving means to the driven means, the clutch comprising cooperating clutch members one of which is associated with the braking means, and interlocking means freely suspended between the clutch members adapted to be moved to a non-interlocking position relative to the clutch members under the direct rotary action of the clutch members themselves, whereby the braking means is adapted to function relative to the driven means upon such de-clutching.

12. The combination, with driving means and means driven thereby, of clutch and brake means interposed between the driving and driven means for transmitting and controlling the power delivered from the driving means to the driven means, said clutch comprising an inner clutch member, an outer member surrounding the inner clutch member, the outer clutch member being associated with the brake means and floating interlocking means between the clutch members adapted to be shifted by the power of one of the clutch members acting relative to the brake means for moving said interlocking means, toward and from the axis of rotation of the clutch members to and from a position interlocking the clutch members, whereby the braking means is adapted to function relative to the driven means upon such de-clutching.

13. The combination, with driving and driven means, of clutching and braking means interposed therebetween for delivering power from the driving to the driven means and for controlling movement of the driven means, said clutching means comprising an inner member connected to receive power directly from the driving means, an outer member surrounding and spaced from the inner member and adapted to receive power therefrom, and interlocking means for the clutch members disposed therebetween and extending parallel to the axis of rotation of the clutch members, said interlocking means being adapted to be shifted sidewise of itself toward and from said axis of rotation upon actuation of the braking means, to and from position interlocking the clutch members, and one of the clutch members being adapted to thrust said interlocking means to the de-clutching position.

14. The combination, with driving and driven means, of clutching and braking means interposed therebetween for delivering power from the driving to the driven means and for controlling the action of the driven means, said clutch comprising a brake drum housing, a clutch member arranged therein and resiliently movable angularly relative thereto, a clutch member within the first clutch member, and interlocking means between the clutch members for delivering power from one to the other, said interlocking means being movable to a non-interlocking relation of said clutch members, and said housing having guiding means for the interlocking means during movement thereof to and from the de-clutching position.

15. The combination, with driving and driven means, of clutching and braking means interposed therebetween for delivering power from the driving to the driven means and for controlling the action of the driven means, said clutch comprising a brake drum housing, a clutch member arranged therein and resiliently movable angularly relative thereto, a clutch member within the first clutch member, and interlocking means interposed between the clutch members for transmitting power from one to the other adapted to be moved substantially radially out of the interlocking relation for leaving one of the clutch members free to move relative to the other, and means on the housing for preventing such substantially radial movement of said locking means during non-application of the brake.

16. The combination, with driving and driven means, of clutching and braking means interposed therebetween for delivering power from the driving to the driven means and for controlling the action of the driven means, said clutch comprising a brake drum housing, a clutch member arranged therein and resiliently movable angularly relative thereto, a clutch member within the first clutch member, and an interlocking pin disposed transversely of and in edgewise engagement with the clutch members and adapted to be moved edgewise to and from an interlocking position relative to such clutch members for at times clutching and at other times de-clutching said members.

17. The combination, with driving and driven means, of clutching and braking means interposed therebetween for delivering power from the driving to the driven means and for controlling the action of the driven means, said clutch comprising a brake drum housing, a clutch member arranged therein and resiliently movable angularly relative thereto, a clutch member within the first clutch member, and an interlocking pin disposed transversely of and in edgewise engagement with the clutch members and adapted to be moved edgewise to and from an interlocking position relative to such clutch members for at times clutching and at other times de-clutching said members, the end portions of said pin extending beyond the clutch members, and the housing being formed with guiding means for said end portions.

18. The combination, with driving means and driven means, of clutching and braking means for transmitting power from the driving means to the driven means and for controlling action of the driven means, the clutching means comprising a brake drum housing, an inner clutch member within the housing, a clutch member surrounding the inner clutch member also within the housing, said clutch members having recesses each opening toward the other and aligned during a clutched relation of said clutching members, and interlocking means arranged in said recesses and engaging the walls thereof for transmitting motion from one clutch member to the other, one of the recesses being of enlarged dimensions sufficient to accommodate said interlocking means out of cooperative engagement with the other clutch member and means for preventing movement of said interlocking means a sufficient distance into the last named recess for escaping from the interlocking relation during a non-application of the braking means.

19. The combination, with driving means and driven means, of clutching and braking means for transmitting power from the driving means to the driven means and for controlling action of the driven means, the clutching means comprising a brake drum housing, an inner clutch member within the housing, a clutch member surrounding the inner clutch member also within the housing, said clutch members having recesses each opening toward the other and aligned during a clutched relation of said clutching members, and interlocking means arranged in said recesses and engaging the walls thereof for transmitting motion from one clutch member to the other, one of the recesses being of enlarged dimensions sufficient to accommodate said interlocking means out of cooperative engagement with the other clutch member and means for preventing movement of said interlocking means a sufficient distance into the last named recess for escaping from the interlocking relation during a non-application of the braking means, and the brake drum housing having a recess laterally of the registering recesses of the clutch members during clutching operation, one of said clutch members being adapted to move relative to the brake drum housing upon application of the braking means to bring the enlarged recess of the clutching member into line with the recess of the housing and thus allow the interlocking means to escape from the interlocking position.

20. The combination, with driving and driven means, of clutching and braking means for transmitting power from the driving means to the driven means and controlling action of the driven means, said clutching means comprising a brake drum housing, a clutch member therein, a second clutch member surrounding the first clutch member, each of the clutch members being formed with a recess and the recesses being in registration during a clutched relation of the clutching members, and the recess of the outer clutching member being enlarged, said housing having at each side of said enlarged recess during a clutched relation of the clutching members, a pocket outstanding away from the inner clutch member in a manner corresponding to the enlargement of the recess in the outer clutch member, a cross-pin occupying the recesses of the clutch members and engaging the walls thereof for transmitting motion from one to the other, and the material of the housing between said lateral pockets extending to position preventing escape of the cross-pin into the enlarged recess and out of clutching engagement with the opposing clutch member while the housing is free to rotate with the clutch members, and the clutch member having the enlarged recess being adapted to move relative to the brake drum housing upon application of the braking means for causing the enlarged recess to register with one or the other of the pockets according to the direction of rotation and for permitting the escape of the cross-pin into said enlarged recess and into said pocket out of interlocking relation of the clutching members.

21. The combination, with driving and driven means, of clutching and braking means for transmitting power from the driving means to the driven means and controlling action of the driven means, said clutching means comprising a brake drum housing, a clutch member therein, a second clutch member surrounding the first clutch member, each of the clutch members being formed with a recess and the recesses being in registration during a clutched relation of the clutching members, and the recess of the outer clutching member being enlarged, said housing having at each side of said enlarged recess during a clutched relation of the clutching members, a pocket outstanding away from the inner clutch member in a manner corresponding to the enlargement of the recess in the outer clutch member, a cross-pin occupying the recesses of the clutch members and engaging the walls thereof for transmitting motion from one to the other, and the material of the housing between said lateral pockets extending to position preventing escape of the cross-pin into the enlarged recess and out of clutching engagement with the opposing clutch member while the housing is free to rotate with the clutch members, and the clutch member having the enlarged recess being adapted to move relative to the brake drum housing upon application of the braking means for causing the enlarged recess to register with one or the other of the pockets according to the direction of rotation and for permitting the escape of the cross-pin into said enlarged recess and into said pocket out of interlocking relation of the clutching members, and resilient means for retaining said cross-pin in the de-clutched relation during continuation of the braking application.

In testimony whereof I affix my signature.

HAROLD E. BREY.